US010975902B2

(12) United States Patent
Colston et al.

(10) Patent No.: US 10,975,902 B2
(45) Date of Patent: Apr. 13, 2021

(54) LEG ASSEMBLY METHODS AND SYSTEMS

(71) Applicant: TRAEGER PELLET GRILLS LLC, Salt Lake City, UT (US)

(72) Inventors: Michael Virgil Colston, Salt Lake City, UT (US); Daniel A. C. Altenritter, Riverton, UT (US)

(73) Assignee: Traeger Pellet Grills, LLC, Salt Lake City, UT (US)

( * ) Notice: Subject to any disclaimer, the term of this patent is extended or adjusted under 35 U.S.C. 154(b) by 0 days.

(21) Appl. No.: 16/319,178

(22) PCT Filed: Dec. 19, 2017

(86) PCT No.: PCT/US2017/067370
§ 371 (c)(1),
(2) Date: Jan. 18, 2019

(87) PCT Pub. No.: WO2018/125681
PCT Pub. Date: Jul. 5, 2018

(65) Prior Publication Data
US 2020/0040926 A1   Feb. 6, 2020

Related U.S. Application Data

(60) Provisional application No. 62/439,215, filed on Dec. 27, 2016.

(51) Int. Cl.
*F16B 12/30* (2006.01)
*A47J 37/07* (2006.01)
(Continued)

(52) U.S. Cl.
CPC .......... *F16B 12/30* (2013.01); *A47J 37/0704* (2013.01); *F16B 12/52* (2013.01); *F16M 11/16* (2013.01)

(58) Field of Classification Search
CPC ......... A47B 2013/006; A47B 2013/022; A47J 37/0704; A47J 2013/006; A47J 2013/022; F16B 12/42; F16B 12/52; F16B 12/30
(Continued)

(56) References Cited

U.S. PATENT DOCUMENTS

| 639,099 A | 12/1899 | Schoregge |
| 1,300,710 A | 4/1919 | Edwards |

(Continued)

FOREIGN PATENT DOCUMENTS

| CN | 104352179 | 2/2015 |
| FR | 2132681 A1 | 11/1972 |
| JP | 59-174411 U | 11/1984 |

OTHER PUBLICATIONS

European Supplementary Search Report and Search Opinion Received for EP Application No. 17889301.2, dated Jun. 27, 2019, 10 pages.
(Continued)

*Primary Examiner* — Bradley Duckworth
(74) *Attorney, Agent, or Firm* — TraskBritt

(57) ABSTRACT

The present disclosure provides systems and methods for assembling a device while maintaining the aesthetic appearance and structural integrity of a visible surface of the device. In one or more implementations of the invention, a system includes a first assembly piece with an assembly region that comprises an opening defined by first and second connecting elements. The system further includes a second assembly piece and a fastening assembly, where a portion of the second assembly piece is shaped to fit within the assembly region opening and the fastening assembly spans the first and second connecting elements to secure the first assembly piece to the second assembly piece, and tightening of the fastening assembly causes the second connecting element to deform, pressing a surface of the second assem- (Continued)

bly piece against an adjacent surface of the first connecting element and retaining a substantially even visible surface of the device.

19 Claims, 4 Drawing Sheets

(51) Int. Cl.
    *F16B 12/52* (2006.01)
    *F16M 11/16* (2006.01)
(58) Field of Classification Search
    USPC .............................. 126/50, 30, 305; 248/188
    See application file for complete search history.

(56) References Cited

U.S. PATENT DOCUMENTS

| | | | |
|---|---|---|---|
| 2,631,076 A * | 3/1953 | Redlich | F16B 12/48 |
| | | | 248/188 |
| D179,345 S | 12/1956 | Herry et al. | |
| 2,822,228 A * | 2/1958 | Comer | A47B 9/08 |
| | | | 248/188 |
| 2,902,026 A | 9/1959 | Hathorn | |
| D188,879 S | 9/1960 | Gauss | |
| D196,553 S | 10/1963 | Mayer | |
| D196,996 S | 11/1963 | Kates | |
| 3,533,393 A | 10/1970 | Haapanen | |
| 3,665,913 A | 5/1972 | Cagle | |
| 3,754,728 A * | 8/1973 | Bowman | F16B 12/52 |
| | | | 248/188 |
| 3,769,901 A | 11/1973 | Phillips | |
| 3,791,370 A | 2/1974 | Fauser | |
| 3,883,104 A | 5/1975 | Delafield | |
| 3,938,493 A | 2/1976 | Bauer | |
| 3,945,740 A | 3/1976 | Weiler | |
| 3,964,404 A * | 6/1976 | Mueller | A47B 57/265 |
| | | | 108/147.14 |
| 4,076,008 A | 2/1978 | Deaton | |
| 4,090,490 A | 5/1978 | Riley et al. | |
| 4,132,178 A | 1/1979 | Mueller et al. | |
| 4,192,113 A * | 3/1980 | Martin, Jr. | E04B 1/6112 |
| | | | 52/282.5 |
| 4,233,890 A | 11/1980 | Jansen | |
| D264,262 S | 5/1982 | Scripter | |
| 4,362,093 A | 12/1982 | Griscom | |
| 4,396,173 A * | 8/1983 | Call, Sr. | F16B 12/14 |
| | | | 248/188 |
| 4,408,928 A * | 10/1983 | Steinke | F16B 7/0446 |
| | | | 403/320 |
| 4,592,335 A | 6/1986 | Beller | |
| 4,665,891 A | 5/1987 | Nemec | |
| 4,700,618 A | 10/1987 | Cox | |
| 4,788,906 A | 12/1988 | Starks | |
| 4,955,358 A * | 9/1990 | Harris | A47J 37/0786 |
| | | | 126/25 R |
| 5,002,247 A * | 3/1991 | Dispenza | A47B 13/021 |
| | | | 108/147.14 |
| 5,031,602 A | 7/1991 | Vick | |
| D320,527 S | 10/1991 | Carroll | |
| 5,070,857 A | 12/1991 | Sarten | |
| 5,163,359 A | 11/1992 | McLane | |
| 5,299,553 A | 4/1994 | Giebel et al. | |
| D350,668 S | 9/1994 | Giebel et al. | |
| D355,745 S | 2/1995 | Greene | |
| 5,404,795 A | 4/1995 | Coble | |
| 5,473,979 A | 12/1995 | Ruben | |
| 5,481,964 A | 1/1996 | Kitten | |
| 5,483,947 A | 1/1996 | Giebel et al. | |
| D369,716 S | 5/1996 | Blanc | |
| 5,524,610 A | 6/1996 | Clark | |
| D376,510 S | 12/1996 | Ting | |
| 5,694,917 A | 12/1997 | Giebel | |
| 5,934,180 A | 8/1999 | Lin | |
| D414,374 S | 9/1999 | Ting | |
| 5,947,007 A | 9/1999 | O'Grady | |
| 6,000,388 A | 12/1999 | Andress | |
| D428,303 S | 7/2000 | Wagner et al. | |
| D428,760 S | 8/2000 | Huang | |
| 6,125,836 A | 10/2000 | Felton | |
| 6,182,560 B1 | 2/2001 | Andress | |
| 6,189,528 B1 | 2/2001 | Oliver | |
| 6,209,533 B1 | 4/2001 | Ganard | |
| D447,913 S | 9/2001 | Cragg | |
| D456,202 S | 4/2002 | McNair | |
| D456,203 S | 4/2002 | Peloquin | |
| 6,397,731 B1 * | 6/2002 | Gillespie | A47J 37/0704 |
| | | | 126/25 R |
| D460,312 S | 7/2002 | Fry et al. | |
| D460,658 S | 7/2002 | Wu | |
| 6,422,134 B1 | 7/2002 | Barksdale | |
| 6,439,220 B1 * | 8/2002 | Johnson | A47J 37/0781 |
| | | | 126/25 R |
| D466,358 S | 12/2002 | Eisinger et al. | |
| 6,557,545 B2 | 5/2003 | Williams | |
| 6,561,082 B2 * | 5/2003 | Gillespie | A47J 37/0704 |
| | | | 99/339 |
| D480,595 S | 10/2003 | Pai | |
| D485,116 S | 1/2004 | Kwok | |
| D494,406 S | 8/2004 | Zhang | |
| D496,821 S | 10/2004 | Pai | |
| 6,810,792 B1 | 11/2004 | Knight | |
| D504,274 S | 4/2005 | Ceccon | |
| D504,798 S | 5/2005 | Nipke et al. | |
| D505,824 S | 6/2005 | Nipke et al. | |
| 6,913,011 B1 | 7/2005 | Snider | |
| D507,927 S | 8/2005 | Nipke et al. | |
| D508,364 S | 8/2005 | Nipke et al. | |
| D508,365 S | 8/2005 | Nipke et al. | |
| D510,835 S | 10/2005 | Pai | |
| D510,838 S | 10/2005 | Nipke et al. | |
| D511,924 S | 11/2005 | Chung | |
| D512,263 S | 12/2005 | Chung | |
| D516,366 S | 3/2006 | Nipke et al. | |
| D526,831 S | 8/2006 | Chung | |
| D526,833 S | 8/2006 | Chung | |
| D526,834 S | 8/2006 | Chung | |
| D528,847 S | 9/2006 | Chung | |
| D534,755 S | 1/2007 | Knight | |
| D535,522 S | 1/2007 | Seager | |
| 7,156,087 B1 | 1/2007 | Churchhill | |
| D562,619 S | 2/2008 | Henley | |
| D563,148 S | 3/2008 | Henry | |
| D572,072 S | 7/2008 | Chung | |
| D576,833 S | 9/2008 | Mansell | |
| D579,260 S | 10/2008 | Zischke | |
| D583,185 S | 12/2008 | Rutter et al. | |
| D592,442 S | 5/2009 | Rutter et al. | |
| 7,624,675 B2 | 12/2009 | Galdamez | |
| D609,959 S | 2/2010 | Chen | |
| D618,037 S | 6/2010 | Chung | |
| D618,483 S | 6/2010 | Chung | |
| 7,753,047 B1 | 7/2010 | Trammell | |
| D623,003 S | 9/2010 | Chung | |
| D623,888 S | 9/2010 | Chung | |
| 7,798,057 B2 | 9/2010 | Ritterling | |
| D631,279 S | 1/2011 | Davis | |
| 7,861,705 B2 | 1/2011 | Hulsey | |
| D638,654 S | 5/2011 | Plott | |
| 7,984,709 B1 | 7/2011 | Brynes | |
| D648,975 S | 11/2011 | Chiang | |
| D653,494 S | 2/2012 | Chung | |
| D657,181 S | 4/2012 | Chung | |
| D660,646 S | 5/2012 | Simms | |
| D668,097 S | 10/2012 | Simms, II | |
| 8,381,712 B1 | 2/2013 | Simms | |
| D680,794 S | 4/2013 | Chung | |
| D680,795 S | 4/2013 | Chung | |
| D680,796 S | 4/2013 | Chung | |
| D687,667 S | 8/2013 | Chien | |
| 8,602,017 B2 * | 12/2013 | May | A47J 37/0704 |
| | | | 126/9 R |
| D708,002 S | 7/2014 | Cruccolini | |

(56) References Cited

U.S. PATENT DOCUMENTS

| | | | |
|---|---|---|---|
| D709,315 S | 7/2014 | Witzel et al. | |
| D714,090 S | 9/2014 | Harper | |
| 8,870,163 B2* | 10/2014 | Regan | E04F 11/1817 256/65.02 |
| D717,094 S | 11/2014 | Chung | |
| D717,095 S | 11/2014 | Chung | |
| D717,096 S | 11/2014 | Chung | |
| D717,098 S | 11/2014 | Chung | |
| 8,915,238 B2 | 12/2014 | Goeken | |
| D724,714 S | 3/2015 | Benson et al. | |
| D724,886 S | 3/2015 | Chung | |
| D736,026 S | 8/2015 | Kam | |
| D738,155 S | 9/2015 | Chung | |
| D739,170 S | 9/2015 | Chung | |
| D744,775 S | 12/2015 | Yang | |
| D767,936 S | 10/2016 | Yang | |
| D780,502 S | 3/2017 | Gloger | |
| D786,014 S | 5/2017 | Knight | |
| D796,258 S | 9/2017 | Streckfus | |
| D798,645 S | 10/2017 | Lira-Ninez | |
| D798,646 S | 10/2017 | Lira-Ninez | |
| D799,259 S | 10/2017 | Lira-Ninez | |
| D806,463 S | 1/2018 | Gloger | |
| D814,226 S | 4/2018 | Mansueto et al. | |
| D817,091 S | 5/2018 | Colston | |
| D817,684 S | 5/2018 | Mansueto et al. | |
| D820,628 S | 6/2018 | Zhou | |
| D825,990 S | 8/2018 | Colston | |
| D827,368 S | 9/2018 | Colston | |
| D827,370 S | 9/2018 | Colston | |
| D827,371 S | 9/2018 | Colston | |
| D829,049 S | 9/2018 | Measom et al. | |
| D829,050 S | 9/2018 | Measom et al. | |
| D832,046 S | 10/2018 | Chung | |
| D835,448 S | 12/2018 | Mansueto et al. | |
| D839,047 S | 1/2019 | Colston | |
| 10,213,051 B2 | 2/2019 | Colston et al. | |
| D842,637 S | 3/2019 | Mansueto et al. | |
| D844,361 S | 4/2019 | Chung | |
| D853,786 S | 7/2019 | Colston et al. | |
| D871,821 S | 1/2020 | Boltz et al. | |
| 2002/0020405 A1 | 2/2002 | Coleman | |
| 2002/0078944 A1* | 6/2002 | Cozzolino | A47J 37/0763 126/41 R |
| 2003/0019491 A1 | 1/2003 | Bossler | |
| 2003/0019492 A1 | 1/2003 | Williams | |
| 2003/0029324 A1 | 2/2003 | Gillespie et al. | |
| 2005/0204934 A1 | 9/2005 | Robertson | |
| 2005/0217659 A1 | 10/2005 | McClenahan | |
| 2006/0016447 A1 | 1/2006 | Meyer | |
| 2006/0042475 A1 | 3/2006 | Craig | |
| 2006/0137676 A1 | 6/2006 | Barker | |
| 2007/0163568 A1 | 7/2007 | Murray | |
| 2007/0175467 A1 | 8/2007 | Liu | |
| 2007/0277805 A1 | 12/2007 | Ho | |
| 2008/0011285 A1 | 1/2008 | Milligan | |
| 2008/0098906 A1 | 5/2008 | Davis | |
| 2009/0139151 A1 | 6/2009 | Quam et al. | |
| 2009/0199839 A1 | 8/2009 | Hulsey | |
| 2010/0024797 A1 | 2/2010 | Tsung | |
| 2010/0059038 A1 | 3/2010 | Ho | |
| 2010/0083947 A1 | 4/2010 | Guillory | |
| 2011/0079209 A1 | 4/2011 | Bruno et al. | |
| 2011/0079210 A1 | 4/2011 | Jackovitch | |
| 2011/0083659 A1 | 4/2011 | Grasso et al. | |
| 2012/0192726 A1 | 8/2012 | Clearman | |
| 2012/0216790 A1 | 8/2012 | Hopkins | |
| 2012/0266857 A1 | 10/2012 | Lin | |
| 2013/0061765 A1 | 3/2013 | Reinhart | |
| 2013/0112088 A1 | 5/2013 | May | |
| 2013/0206132 A1 | 8/2013 | Simms | |
| 2013/0292520 A1 | 11/2013 | Alden | |
| 2013/0298894 A1 | 11/2013 | Kleinsasser | |
| 2014/0090634 A1 | 4/2014 | Li | |
| 2014/0261012 A1 | 9/2014 | Perez, Jr. et al. | |
| 2015/0047512 A1 | 2/2015 | Marra | |
| 2015/0047515 A1 | 2/2015 | Jenness | |
| 2015/0047625 A1 | 2/2015 | Weil | |
| 2015/0079250 A1 | 3/2015 | Ahmed | |
| 2015/0144238 A1 | 5/2015 | Traeger | |
| 2015/0265099 A1 | 9/2015 | Coffee | |
| 2015/0305559 A1 | 10/2015 | Chung | |
| 2016/0345739 A1 | 12/2016 | McCullough | |
| 2017/0020336 A1 | 1/2017 | Cole et al. | |
| 2017/0065124 A1 | 3/2017 | Colston | |
| 2017/0067649 A1 | 3/2017 | Colston | |
| 2017/0196400 A1 | 7/2017 | Colston | |
| 2018/0296031 A1 | 10/2018 | Terrell et al. | |
| 2018/0368618 A1 | 12/2018 | Measom et al. | |
| 2019/0150663 A1 | 5/2019 | Colston et al. | |

OTHER PUBLICATIONS

Ex Parte Quayle Action for U.S. Appl. No. 29/539,822, dated Jun. 13, 2018 5 pages.
Final Rejection for U.S. Appl. No. 15/070,220, dated Feb. 1, 2019, 11 pages.
International Search Report for International Application No. PCT/US2017/067370, dated Apr. 16, 2018, 3 pages.
International Written Opinion for International Application No. PCT/US2017/067370, dated Apr. 16, 2018, 9 pages.
Non-Final Office Action for U.S. Appl. No. 29/539,825 dated Dec. 28, 2017, 12 pages.
Non-Final Rejection for U.S. Appl. No. 15/070,220, dated Jun. 21, 2019 12 pages.
Notice of Allowance for U.S. Appl. No. 29/539,822, dated Sep. 4, 2018 8 pages.
Supplementary European search report dated Jun. 27, 2019 for EP Application No. 17889301, 9 pages.
International Search Report and Written Opinion for application No. PCT/US2017/067370 dated Apr. 16, 2018.
Korean Grounds for Rejection for Korean Application No. 10-2018-7029165, dated Oct. 25, 2019, 17 pages.
Non-Final Action mailed for U.S. Appl. No. 15/070,225 dated Feb. 23, 2018.
Non-Final Office Action for U.S. Appl. No. 29/539,822 dated Dec. 28, 2017.
Traeger Timberline 1300, by John R. Delaney, PCMag [online], published Aug. 4, 2017, [retreived on Dec. 21, 2017]. Retreived from the Internet, URL: https://www.pcmag.com/review/355354/traeger-timberline-1300.
Non-Final Action mailed for U.S. Appl. No. 15/070,220 dated Sep. 6, 2018.
Notice of Allowance mailed for U.S. Appl. No. 15/070,225 dated Oct. 10, 2018.
International Search Report for application No. PCT/US2016/051060 dated Dec. 8, 2016.
International Search Report for application No. PCT/US2016/051066 dated Dec. 8, 2016.
Restriction Requirement for U.S. Appl. No. 14/906,526 dated Sep. 12, 2017.
International Search Report and Written Opinion for application No. PCT/US2015/046349 dated Dec. 28, 2015.
Combined Search Examination Report for application No. GB1604584.1 dated Jul. 27, 2016.
AMAZON.COM Inc., 2014, "The Original Bar-Be Quick Build in Grill & Bake + Free pack of Beechwood smoking chips", amazon.co.uk, [online], Available from https://www.amazon.co.uk/Original-Bar-Be-Quick-Build-Beechwood-smoking/dp/B00IGUPK4C [Accessed Jul. 22, 2015].
Non-Final Office Action for U.S. Appl. No. 14/906,526 dated Dec. 11, 2017.
Non-Final Office Action for U.S. Appl. No. 29/539,825 dated Dec. 28, 2017.
European Communication pursuant to Article 94(3) EPC for European Application No. 17889301.2, dated Apr. 8, 2020, 4 pages.

* cited by examiner

LEG ASSEMBLY METHODS AND SYSTEMS

CROSS REFERENCE TO RELATED APPLICATIONS

The present invention is a 35 U.S.C. § 371 U.S. National Stage of PCT Application No. PCT/US2017/067370, filed on Dec. 19, 2017, which claims priority to U.S. Provisional Patent Application No. 62/439,215, filed Dec. 27, 2016. The entire content of each of the aforementioned patent applications is incorporated herein by reference.

TECHNICAL FIELD

This disclosure generally relates to systems and methods of attaching and/or securing components during assembly of a device. More specifically, the present disclosure relates to systems and methods of attaching and/or securing components during assembly of a device while maintaining the aesthetics and structural integrity thereof.

BACKGROUND

Advances in manufacturing and distribution have made it possible to create, package, and distribute high volumes of ready to assemble consumer goods. In some instances, the distributor or retailer assembles the consumer goods before the point of sale, but it is also common for ready to assemble consumer goods to be packaged with assembly instructions, making it possible for the consumer herself to assemble the packaged device at home or at another preferred location. Regardless of who assembles the device, it is often important that the finally assembled product functions as intended and that the assembly process does not significantly affect the overall structural integrity and aesthetic appearance of the device.

Aesthetics can play a significant role in the perceived quality and workmanship of a consumer device. If, for example, there is a crack, scratch, or dent on the device, some consumers—and even some distributors and retailers—may assume the product is constructed of a low quality material or is otherwise defective, even though the crack, scratch, or dent may not affect the device's designed functionality or its structural integrity. On the other hand, a device lacking aesthetic malformations may connote a high level of workmanship and product quality, which may, in turn, increase consumer confidence in and satisfaction with the product.

Unfortunately, some goods may include an aesthetically unpleasant malformation as a result of the post-manufacturing assembly process. Such malformations may not actually affect the quality or structural integrity of the device, but the device may nonetheless suffer from a consumer perception that it is in some way an aberrant device or that the device's structural integrity is somehow flawed.

Accordingly, there are a number of disadvantages with system and methods of assembling devices that can be addressed.

BRIEF SUMMARY

Implementations of the present disclosure solve one or more of the foregoing or other problems in the art with systems and methods for assembling a device while maintaining the aesthetic appearance and structural integrity of a visible surface of the device. In particular, in one or more implementations a system includes a first assembly piece with an assembly region that comprises an opening defined by first and second connecting elements. The system further includes a second assembly piece, wherein a portion of the second assembly piece is shaped to fit within the opening of the assembly region. The system further includes a fastening assembly configured to span the first and second connecting elements and to secure the first assembly piece to the second assembly piece. Upon tightening of the fastening assembly, the second connecting element may deform and press a surface of the second assembly piece against an adjacent surface of the first connecting element such that the visible surface of the first connecting element retains a substantially even surface.

Systems and methods of the present disclosure can also include a system for attaching a leg to a grill skirt without deforming a visible surface of the grill skirt. In particular, in one or more implementations a system includes a grill skirt with a substantially even visible surface and a leg attachment region having an arcuate surface. The system further includes a securing element associated with the leg attachment region such that an opening is defined between the securing element and the leg attachment region. The system further includes a leg, wherein at least a portion of the leg is configured to be received in the opening of the securing element. The system can further include a fastening assembly configured to span the grill skirt and the securing element, wherein upon tightening the fastening assembly, the securing element may deform and press the leg against the leg attachment region and retaining the substantially even visible surface of the grill skirt.

Systems and methods of the present disclosure can also include a method of assembling a device while maintaining the aesthetic appearance and structural integrity of a visible surface of the device. In particular, one or more implementations provide a method that includes a step of aligning a first assembly piece having a substantially even surface with a second assembly piece, wherein at least a portion of the second assembly piece is shaped to fit within an opening defined by a first connecting element and a second connecting element of an assembly region associated with the first assembly piece. The method further includes a step of securing the first assembly piece to the second assembly piece using a fastening assembly that is configured to span the first connecting element and the second connecting element. The method further includes a step of tightening the fastening assembly such that the second connecting element may deform and press a surface of the second assembly piece against an adjacent surface of the first connecting element such that the visible surface of the first assembly piece retains a substantially even surface.

Accordingly, systems and methods for assembling a device while maintaining the aesthetic appearance and structural integrity of a visible surface of the device are disclosed.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

Additional features and advantages of the disclosure will be set forth in the description that follows, and in part will be obvious from the description, or may be learned by the practice of the disclosure. The features and advantages of the disclosure may be realized and obtained by means of the instruments and combinations particularly pointed out in the appended claims. These and other features of the present disclosure will become more fully apparent from the following description and appended claims, or may be learned by the practice of the disclosure as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof, which are illustrated in the appended drawings. It is appreciated that these drawings depict only typical embodiments of the disclosure and are not therefore to be considered to be limiting of its scope.

DETAILED DESCRIPTION

Figure 1:
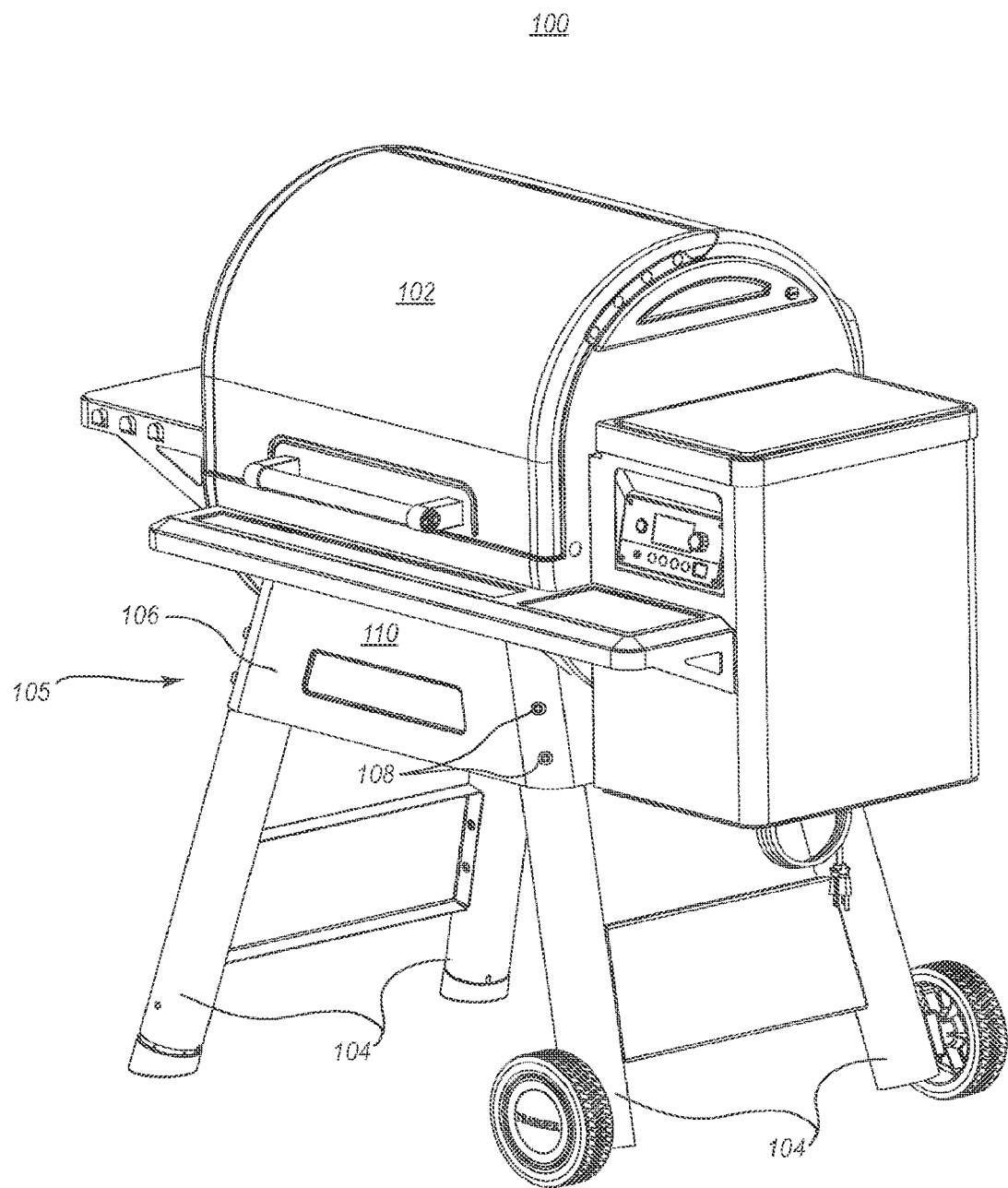
FIG. 1 illustrates a perspective view of an exemplary assembled system having a visible surface that is aesthetically and structurally maintained according to one or more implementations of the present disclosure.

Before describing various embodiments of the present disclosure in detail, it is to be understood that this disclosure is not limited to the parameters of the particularly exemplified systems, methods, apparatus, products, processes, and/or kits, which may, of course, vary. Thus, while certain embodiments of the present disclosure will be described in detail, with reference to specific configurations, parameters, components, elements, etc., the descriptions are illustrative and are not to be construed as limiting the scope of the present disclosure. In addition, the terminology used herein is for the purpose of describing the embodiments, and is not necessarily intended to limit the scope of the present disclosure.

To facilitate understanding, like reference numerals (i.e., like numbering of components and/or elements) have been used, where possible, to designate like elements common to the figures. Specifically, in the exemplary embodiments illustrated in the figures, like structures, or structures with like functions, will be provided with similar reference designations, where possible. Specific language will be used herein to describe the exemplary embodiments. Nevertheless, it will be understood that no limitation of the scope of the disclosure is thereby intended. Rather, it is to be understood that the language used to describe the exemplary embodiments is illustrative only and is not to be construed as limiting the scope of the disclosure (unless such language is expressly described herein as essential).

Implementations of the present disclosure solve one or more problems in the art of systems and methods for assembling a device while maintaining the aesthetic appearance and structural integrity of a visible surface of the device. Many devices are produced piecemeal, having individual parts fabricated in bulk followed by the post-manufacture assembly of these parts into a functional apparatus or system. Many consumer devices and systems—and even many industrial devices and systems—are sold or otherwise provided in a ready to assemble state. As such, it is advantageous that the device and/or system maintain its structural integrity and proper aesthetic appearance during and after the assembly process.

For example, many ready to assemble devices and systems require common tools for assembly, making it more likely that the average consumer, distributor, and/or retailer would have the necessary tools to properly assemble the device/system. Thus, it is often the case that ready to assemble systems are supplied with any of a variety of common fasteners to couple one or more pieces together during assembly. Some fasteners often included in such ready to assemble devices comprise fasteners that couple one or more pieces together through compressive forces (e.g., threaded mating pairs such as, for example, a bolt and nut). While these types of fasteners are common and provide many advantages for use in ready to assemble furniture, it is possible that the fastener may be over tightened, causing the associated assembly piece(s) to deform as a result of the compressive force.

Such deformations may, at the worst, cause a catastrophic rupture in the structural integrity of the device, rendering the affected portion—and possibly the entire device itself—structurally unsound and unusable. In some instances, deformations may cause subtle malformations that do not appreciably affect the structural integrity of the device. However, such subtle malformations may also affect the aesthetic appearance of the device, and defects (e.g., deformations/malformations) in the aesthetic appearance—particularly those affecting visible surfaces—are likely to produce a perception that the device is structurally unsound, poorly or cheaply constructed, or otherwise undesirable.

As a non-limiting example, many barbeque and/or smoking grills (hereinafter "grills") are mass produced in individual parts and assembled in a post-manufacturing setting. An exemplary assembled grill 100 is depicted in FIG. 1 and comprises a grilling body 102, one or more support legs 104, and a grill skirt 106 that covers at least a portion of the one or more support legs 104. During the assembly process, the support legs 104 are attached to the grilling body 102 by one or more fastening assemblies 108 that penetrate the grill skirt and the one or more support legs 104. However, upon tightening fastening assemblies 108, the fastening assemblies pull the associated support leg 104 toward the grill skirt 106 to form a secure association therewith, and in doing so, the head of the fastener (being proximate the grill skirt) is subjected to such intense and localized compressive forces as to potentially cause a dent or otherwise deform a visible surface 110 of the grill skirt 106.

Such a deformation on the visible surface of the grill skirt may not appreciably affect the structural integrity of the grill, but it may be aesthetically off-putting, leading to any of a number of negative assumptions as to the quality of the product or its functionality. On the other hand, the deformation may be so severe that it does, indeed, affect the structural integrity of the grill.

It may be possible to distribute the force placed on the visible surface by using, for example, a flat washer positioned between the visible surface and the head of the fastener. Flat washers are typically used to disperse forces over a larger surface area, thereby decreasing the likelihood that a deformation will occur as a result of the compressive forces being applied, but depending on the force being applied, flat washers may also deform. Additionally or alternatively, the surface beneath the washer may deform from the forces applied thereto. Further, flat washers may detract from the aesthetic appearance of the device, particularly if the washer is placed on a visible surface, and to maintain the desired look of the assembled object, use of a flat washer may not be practicable. Accordingly, additional or alternative systems and methods are needed.

Implementations of the present disclosure enable assembly of a device while maintaining the aesthetic appearance and structural integrity of a visible surface of the device. Some implementations may be directed with specific reference to grills, but it should be understood that the inventive concepts provided herein are applicable to any device and/or system that is assembled or to any device and/or system that couples two or more pieces using a fastening assembly.

In general, implementations of the present disclosure extend to systems for assembling a device while maintaining the aesthetic appearance and structural integrity of a visible surface of the device. In one or more implementations, the system comprises first and second assembly pieces, and a fastening assembly. The first assembly piece may comprise at least one assembly region having an opening that is defined by first and second connecting elements, where at least a portion of the second assembly piece is shaped to fit within the opening. In one implementation, the first connecting element is a portion of the first assembly piece. In one or more implementations the fastening assembly may be configured to span the first connecting element and the second connecting element, securing the first assembly piece to the second assembly piece, and when the fastening assembly is tightened, the second connecting element may deform and press a surface of the second assembly piece against an adjacent surface of the first connecting element.

Figure 2:
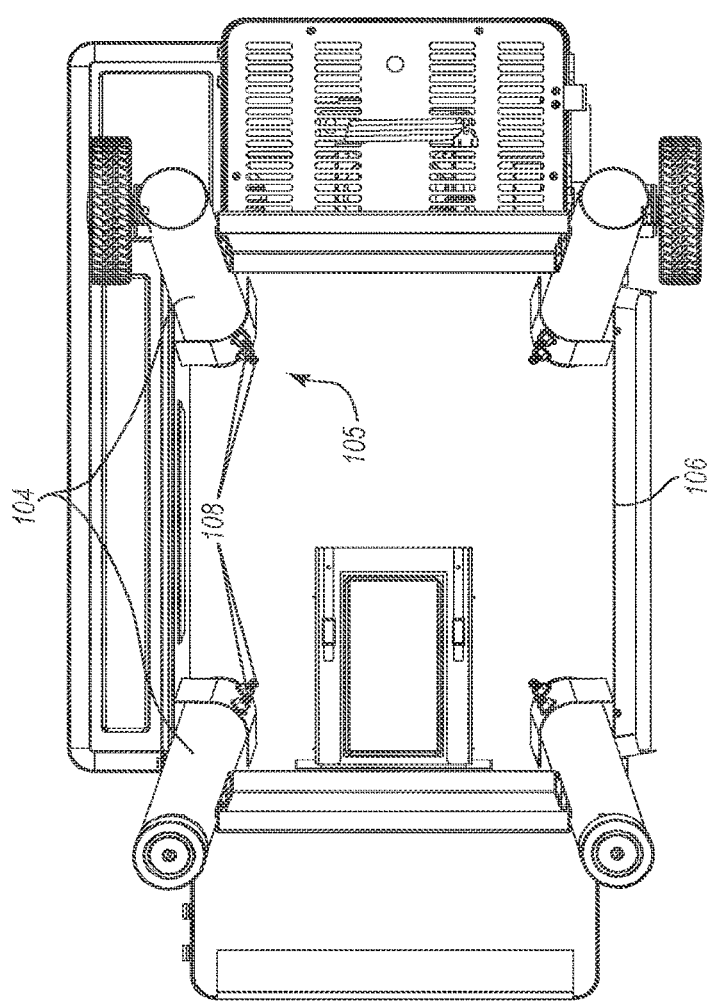
FIG. 2 illustrates a bottom view of an exemplary assembled system having a visible surface that is aesthetically and structurally maintained according to one or more implementations of the present disclosure.

The foregoing may be more particularly described with reference to the drawings. For example, FIG. 1 depicts a perspective view of an exemplary assembled system (i.e., a grill skirt) 106 having a visible surface that is aesthetically and structurally maintained, and FIG. 2 illustrates a bottom view of the system of FIG. 1. In the depicted implementation, the aforementioned first assembly piece comprises a grill skirt 106, the aforementioned second assembly piece comprises support legs 104, the aforementioned visible surface comprises the visible surface 110 of the grill skirt 106, and the fastening assembly comprises fastening assemblies 108.

Figure 3B:
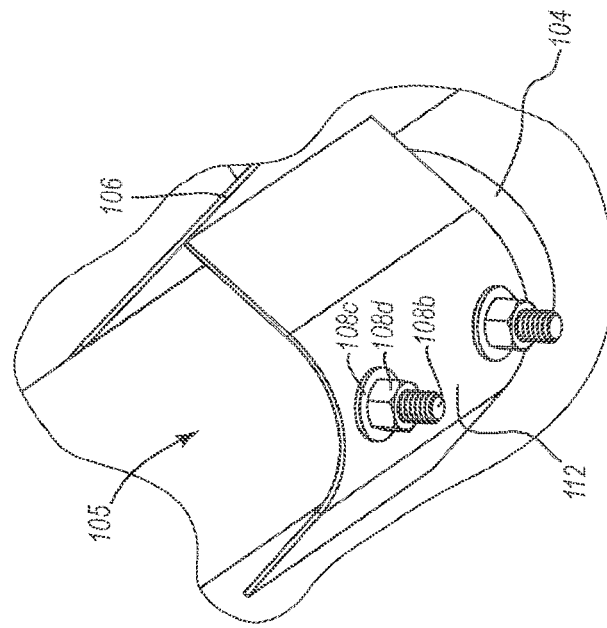
FIG. 3B illustrates a rear view of an assembly region according to one or more implementations of the present disclosure.
Figure 3A:
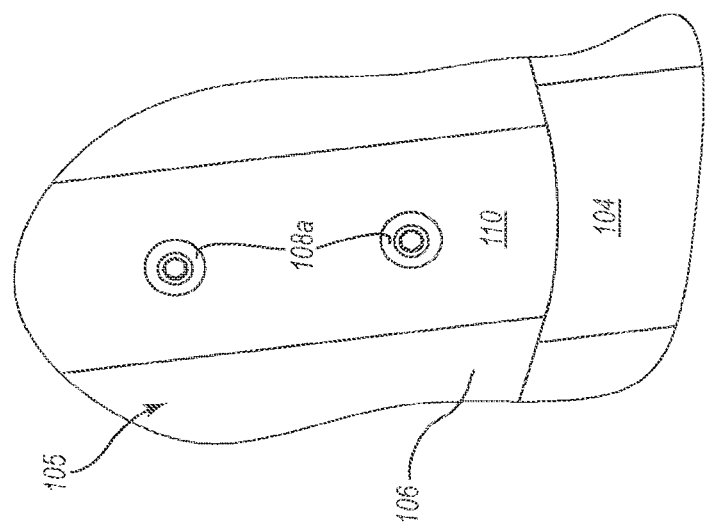
FIG. 3A illustrates a front view of an assembly region where a visible surface of an exemplary system is aesthetically and structurally maintained according to one or more implementations of the present disclosure.
Figure 3C:
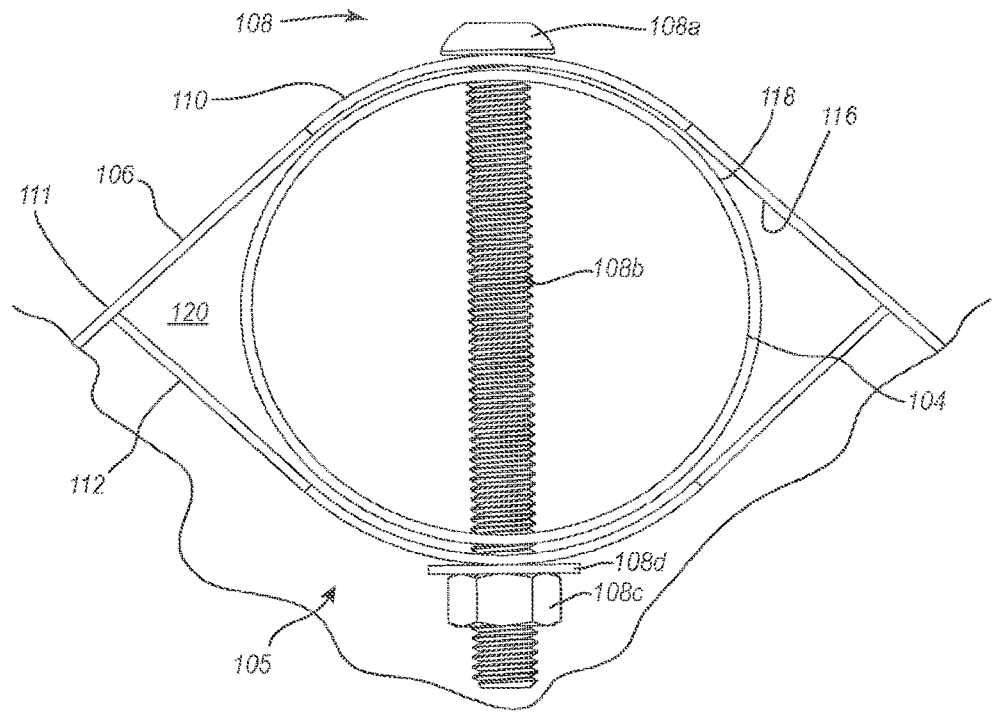
FIG. 3C illustrates a cross-sectional view of an assembly region according to one or more implementations of the present disclosure.

FIG. 3 further illustrates one or more implementations of the present disclosure. That is, various views of the assembly regions 105 illustrated in FIGS. 1 and 2 are provided in FIG. 3. FIG. 3A illustrates a front view of assembly region 105, FIG. 3B illustrates a rear and/or bottom perspective view of assembly region 105, and FIG. 3C illustrates a cross-sectional view of assembly region 105 according to one or more implementations of the present disclosure.

Perhaps more clearly shown in FIG. 3A, the visible surface 110 of grill skirt 106 is substantially even and not deformed (i.e., the visible surface 110 has maintained its aesthetic appearance and structural integrity), particularly where the heads 108a of fastening assemblies 108 are associated with the grill skirt 106.

Referring now to FIG. 3B, a rear perspective view of assembly region 105 is depicted. As illustrated, the threaded rod 108b of fastening assembly 108 penetrates the second assembly piece (e.g., the support leg) 104 and the second connecting element 112. Associated therewith is a flat washer 108d and threaded nut 108c.

Perhaps best depicted by FIG. 3C, assembly region 105 comprises a fastening assembly, which as depicted is a mating pair of threaded fasteners comprising a threaded rod 108b and complementary threaded nut 108c with a flat washer 108d interposed between the two. In one or more implementations of the present disclosure, a flat washer 108d may be excluded from the fastening assembly. Additionally or alternatively, additional flat washers may be used in positions known to and commonly used by those skilled in the art. As illustrated in FIG. 3C, the head 108a of fastening assembly 108 is adjacent the visible surface 110 of the first assembly piece 106 (e.g., the grill skirt), and the flat washer 108d is adjacent the second connecting element 112 and adjacent the threaded nut 108c. In one or more implementations of the present disclosure, the fastening assembly may comprise any fastening assembly known in the art that fastens two or more objects by means of compression, including without limitation threaded mating pairs, rivets, and the like.

Upon tightening and/or compression of one or more components by the fastening assembly 108, the second connecting element 112 may deform or otherwise be compressed toward the second assembly piece 104, which in turn presses a surface 116 of the second assembly piece 104 against an adjacent interior surface 118 of the first connecting element 111. In one or more implementations, and as depicted in FIG. 3C, the surface 116 of the second assembly piece 104 is complementary to at least a portion of the adjacent interior surface 118 of the first connecting element 111 such that the second assembly piece 104 acts as a form to the first connecting element 111, assisting in the distribution of forces applied to the first connecting element 111 during tightening of fastening assembly 108. In one or more embodiments, such distribution of force acts to maintain the substantially even surface of a visible surface 110 of the first assembly piece 106.

For the purposes of this disclosure, the term "substantially even surface" is understood to mean a surface that has not failed (e.g., deformed, bulged, dented, etc.) as a result of compressive forces applied directly or indirectly to the surface during assembly of a device comprising the surface. Thus, it should be understood that the term "substantially even surface" is made with reference to a surface belonging to any number or type of contoured surfaces (e.g., arcuate, flat, etc.). For example, an arcuate surface may comprise a substantially even surface along the contour of the arcuate surface insofar as the surface has not failed (e.g., deformed, bulged, dented, etc.) as a result of compressive forces applied during assembly of the device comprising the arcuate surface. As another example, a grill skirt comprising a surface having two distinct planar surfaces (e.g., there is a designed groove or depression on the surface) maintains a substantially even surface if neither planar surface fails (e.g., deforms, bulges, dents, etc.) as a result of compressive forces applied during assembly of the device comprising the surface having two distinct planar surfaces.

In other words, and with particular reference to the exemplary embodiment of a grill, when the grill is assembled and the associated fasteners are tightened, the second connecting element may collapse and/or deform, pushing the leg into the interior surface of the grill skirt. In doing so, the leg becomes and/or acts as a form for the grill skirt, such that additional tightening of the threaded bolt and nut fastener causes the grill skirt to conform to the contour of the leg, if at all. In this manner, the aesthetic appearance of a visible surface of the grill skirt is maintained in addition to its structural integrity. This is in contrast to a grill lacking a collapsible and/or deformable second connecting element that experiences denting and/or deforming of the visible surface of the grill skirt—and potentially affecting the structural integrity of the grill skirt, itself—upon tightening of the fastening assembly and coincident localized compression of the grill skirt by the head of the fastener.

Furthermore, the collapsible and/or deformable second connecting element allows the leg to nestle against the grill skirt, and as the threaded bolt or other fastener is tightened or otherwise secured, the leg is forced into tighter association with the grill skirt. As indicated above, this maintains the visible surface of the grill skirt, but it also provides other functional benefits. For example, the legs are more securely fastened to the grill, providing a sturdier assembly. That is, in some embodiments, such an assembly is less likely to result in a "wobbly" leg. Instead, legs attached in such a manner are more likely to sit squarely on the ground, which provides the additional benefit of added stability to the assembled system.

Accordingly, the present disclosure may be applied to various assembled systems, including and apart from grills. For example, an assembled table may have legs that attach to an analogous skirt at the periphery of the table edge or may have sleeves with a deformable side that act in an analogous manner to secure the legs thereto, and in doing so preserve the aesthetic appearance and/or increase the structural integrity of the assembled object.

In a similar fashion to that described above and with respect to FIGS. 1-4, embodiments of the present disclosure may be applied to assembled systems having any number of shape of legs and/or skirt. In one embodiment, the legs are angular (e.g., square, polygonal, or similar.). In other embodiments, the legs are arcuate (e.g., circular—as shown in the accompanying figures—oblong, or similar). In yet other embodiments, the legs are a combination of angular and arcuate geometries (e.g., frustoconical, etc.). Generally, the legs may be part of any assembled system, including, for example, chairs, tables, desks, etc. and may add additional benefits to assembled objects where the weight of the surface above the legs is greater or significantly greater than the weight of the associated skirt (or analogous component) as the legs are structurally reinforced through their forced interaction with the skirt (or analogous component).

As used herein, the term "analogous" generally connotes a comparable relationship between two things. For example, methods carried out in comparable ways (or even substantially the same way) or with comparable (or substantially the same) components, modules, etc., are understood to be analogous. In some instances, the term "analogous" connotes a counterpart of one or more components, elements, etc. For example, a grill with multiple legs may be attached to a single skirt. Each leg is considered analogous to each other leg of the same grill assembly. Similarly, legs from two similar or substantially similar grills are analogous as they serve the same or substantially the same function of maintaining the grill in an upright position. In the same or similar manner, a grill skirt may have an analogous component in a table or chair such that the analogous component maintains a comparable relationship (functional or otherwise) with the grill skirt. For example, an analogous component to a grill skirt existing on a table includes an angular form that receives an angular table leg, and one end of the angular analogous component deforms to force the leg to conform to one or more sides of the analogous component such that the leg provides additional structural integrity to the analogous component and/or increases the stability of the assembled table, particularly of the leg assembled thereto. Thus, analogous skirts and/or legs can be used in one or more embodiments of the present disclosure without departing from the scope of the disclosure.

In one or more embodiments of the present disclosure, the first connecting element is the same as at least a portion of the first assembly piece.

In one or more implementations of the present disclosure, the second connecting element collapses and/or deforms. This may be implemented, for example, by having a second connecting element that is made of the same material as the first connecting element but wherein the thickness of the second connecting element is less than the thickness of the first connecting element. In such an implementation, the second connecting element will fail (e.g., collapse and/or deform) under less compressive stress than the first connecting element. In doing so, the second connecting element, upon failure, will collapse toward the second assembly piece, causing the second assembly piece to be compelled toward the first assembly piece, and in one or more embodiments where the first connecting element and the second assembly pieces are complementary in shape, the second assembly piece acts as a form to the first connecting element. In such fashion, additional force applied to the first connecting element will cause a dispersion of the force to effectively maintain the visible surface of the first connecting element/first assembly piece in a substantially even (e.g., undented and/or undeformed) state.

In one or more embodiments of the present disclosure, the foregoing may be accomplished in addition to or alternatively from differing the thicknesses of the same material by incorporating different materials into the first and/or second connecting elements. For example, a second connecting element may comprise one or more materials that deform under less compressive stress than one or more materials comprising the first connecting element. As a non-limiting example, the first connecting element may comprise steel, whereas the second connecting element may comprise aluminum or an aluminum alloy that is defined by a higher degree of malleability. In other words, the metal comprising the second connecting element will deform under less compressive and/or concussive force than the metal comprising the first connecting element to accomplish substantially the same purpose of deformation described above with respect to first and second connecting elements having differing thicknesses.

In one or more implementations of the present disclosure, the second material comprises a thermoplastic elastomer or other flexible plastic and/or elastomer or any other material known to those having skill in the art that would cause the second connecting element to collapse before the first connecting element and/or any portion of the first assembly piece.

In one or more implementations of the present disclosure, the first and second connecting elements may comprise the same (or a different) material, wherein the second connecting element comprises pre-weakened sections and/or perforated sections that will cause the second connecting element to collapse and/or deform as a result of a compressive stress that does not cause the first connecting element (and in some implementations the first connecting piece) to deform or otherwise fail, thereby maintaining a visible surface of the first connecting piece that is substantially even.

Figure 4:
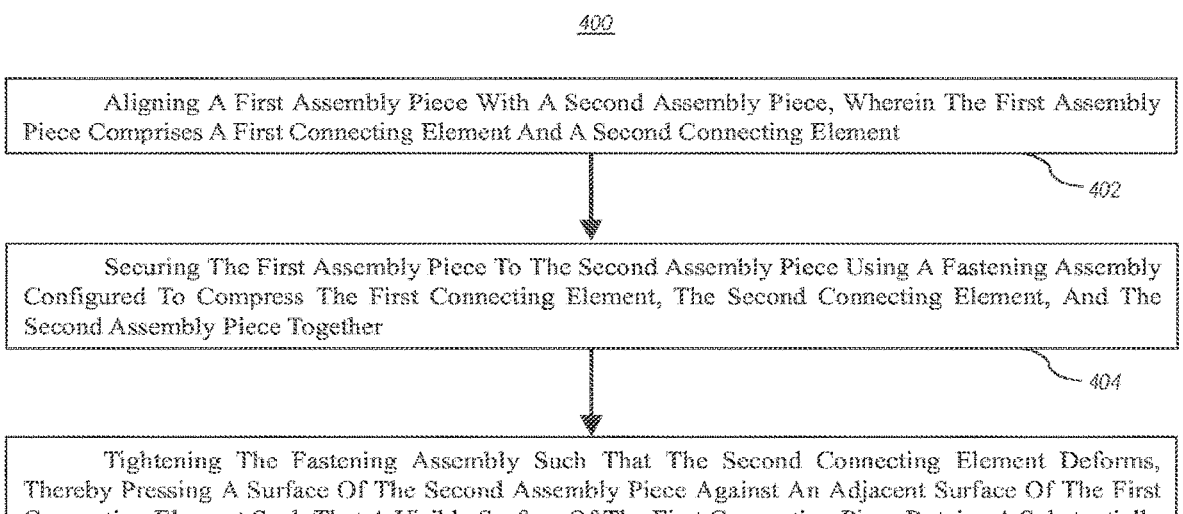
FIG. 4 illustrates a flow diagram illustrating an exemplary method for assembling a device while maintaining the aesthetic appearance and structural integrity of a visible surface according to one or more implementations of the present disclosure.

With continued reference to FIG. 3, the second assembly piece 104 is depicted as being positioned within an opening 120 defined by the first and second connecting elements 111, 112. Stated another way, the second assembly piece 104 is shaped to fit within an opening 120 defined by the first and second connecting elements 111, 112. In one or more implementations of the present disclosure, the second assembly piece 104 is associated with a plurality of fastening assemblies 108. As depicted in FIG. 3, the second assembly piece 104 is associated with two fastening assemblies 108. In one or more implementations, the first and second assembly pieces 104, 106 are associated with a single fastening assembly 108. The number and/or type of fastening assemblies may vary insofar as at least one fastening assembly 108 is associated with at least one pair of first and second assembly pieces 104, 106. Referring now to FIG. 4, depicted is a flow diagram illustrating an exemplary method 400 for assembling a device while maintaining the aesthetic appearance and structural integrity of a visible surface according to one or more implementations of the present disclosure. The method of FIG. 4 may comprise step 402 of aligning a first assembly piece with a second assembly piece, wherein the first assembly piece comprises a first connecting element and a second connecting element. In one or more implementation of the present disclosure, step 402 may be practiced when assembling a grill as illustrated in FIGS. 1-3. More particularly, step 402 may comprise aligning a grill skirt with a support leg, where the grill skirt has a substantially even visible surface and the support leg is shaped to fit within an opening of an assembly region defined by first and second connecting elements of the grill skirt.

The method of FIG. 4 may further comprise step 404 of securing the first assembly piece to the second assembly piece using a fastening assembly configured to compress the first connecting element, the second connecting element, and the second assembly piece together. In one or more implementations of the present disclosure, step 404 may comprise securing a grill skirt to a support leg using a threaded mating pair that spans the grill skirt and support leg.

The method of FIG. 4 may further comprise step 406 of tightening the fastening assembly such that the second connecting element deforms, thereby pressing a surface of the second assembly piece against an adjacent surface of the first connecting element such that a visible surface of the first connecting piece retains a substantially even surface. In one or more implementations of the present disclosure, step 406 may comprise tightening a threaded mating pair, causing the second connecting element to deform and press the support leg into an interior surface of the grill skirt. The support leg may then act as a form to keep the grill skirt from deforming as a result of the compressive forces applied by the threaded mating pair—in essence maintaining a substantially even visible surface on the grill skirt.

Various alterations and/or modifications of the inventive features illustrated herein, and additional applications of the principles illustrated herein, which would occur to one skilled in the relevant art and having possession of this disclosure, can be made to the illustrated embodiments without departing from the spirit and scope of the present disclosure as defined by the claims, and are to be considered within the scope of this disclosure. Thus, while various aspects and embodiments have been disclosed herein, other aspects and embodiments are contemplated. While a number of methods and components similar or equivalent to those described herein can be used to practice embodiments of the present disclosure, only certain exemplary components and methods are described herein.

It will also be appreciated that systems, devices, products, kits, methods, and/or processes, according to certain embodiments of the present disclosure may include, incorporate, or otherwise comprise properties, features (e.g., components, members, elements, parts, and/or portions) described in other embodiments disclosed and/or described herein. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of the features to the specific embodiment. Rather, it will be appreciated that other embodiments can also include the features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Various aspects of the present disclosure, including devices, systems, and methods may be illustrated with reference to one or more embodiments or implementations, which are exemplary in nature. As used herein, the term "exemplary" means "serving as an example, instance, or illustration," and should not necessarily be construed as preferred or advantageous over other embodiments disclosed herein. In addition, reference to an "implementation" of the present disclosure includes a specific reference to one or more embodiments thereof, and vice versa, and is intended to provide illustrative examples without limiting the scope of the present disclosure, which is indicated by the appended claims rather than by the following description.

As used throughout this present disclosure, the words "can" and "may" are used in a permissive sense (i.e., meaning having the potential to), rather than the mandatory sense (i.e., meaning must). Additionally, the terms "including," "having," "involving," "containing," "characterized by," as well as variants thereof (e.g., "includes," "has," "involves," "contains," etc.), and similar terms as used herein, including within the claims, shall be inclusive and/or open-ended, shall have the same meaning as the word "comprising" and variants thereof (e.g., "comprise" and "comprises"), and do not exclude additional un-recited elements or method steps, illustratively.

It will be noted that, as used in this specification and the appended claims, the singular forms "a," "an" and "the" include plural referents unless the context clearly dictates otherwise. Thus, for example, reference to a singular referent (e.g., "widget") includes one, two, or more referents. Similarly, reference to a plurality of referents should be interpreted as comprising a single referent and/or a plurality of referents unless the content and/or context clearly dictate otherwise. For example, reference to referents in the plural form (e.g., "widgets") does not necessarily require a plurality of such referents. Instead, it will be appreciated that independent of the inferred number of referents, one or more referents are contemplated herein unless stated otherwise.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. While certain embodiments and details have been included herein and in the attached disclosure for purposes of illustrating embodiments of the present disclosure, it will be apparent to those skilled in the art that various changes in the methods, products, devices, and apparatus disclosed herein may be made without departing from the scope of the present disclosure, which is defined in the appended claims. All changes that come within the meaning and range of equivalency of the claims are to be embraced within their scope.

What is claimed is:

1. A system for assembling a grill, the system comprising:
   a grill skirt comprising at least four assembly regions, each of the at least four assembly regions comprising:
      a corner region of a single outer connecting element;
      a discrete inner connecting element; and
      an opening defined by the corner region of the single outer connecting element and the inner connecting element;
   at least four support legs, wherein at least a portion of each of the support legs is shaped to fit within a respective opening of one of the at least four assembly regions; and
   at least four fastener assemblies, each fastener assembly configured to span a respective opening defined by a respective corner region of the single outer connecting element and a respective inner connecting element and secure the grill skirt to a respective support leg, wherein tightening of the fastener assembly causes the respective inner connecting element to deform thereby pressing a surface of the respective support leg against an adjacent surface of the respective corner region of the single outer connecting element to retain a substantially even surface of a visible surface.

2. The system of claim 1, wherein the single outer connecting element is an integral portion of the grill skirt.

3. The system of claim 1, wherein the visible surface of the grill comprises a visible surface of the grill skirt.

4. The system of claim 1, wherein each of the at least four fastener assemblies comprises a mating pair of threaded fasteners.

5. The system of claim 4, wherein the mating pair of threaded fasteners comprise a nut and bolt.

6. The system of claim 1, wherein the first single outer connecting element and discrete inner connecting elements comprise the same material.

7. The system of claim 1, wherein the first single outer connecting element comprise a first material and the discrete inner connecting elements comprise a second material, and wherein the second material is different from the first material.

8. The system of claim 7, wherein the second material comprises a malleable metal, and wherein the second material is more malleable than the first material.

9. The system of claim 1, wherein the second discrete inner connecting elements comprise a material having a thickness that is less than a thickness of the single outer connecting element.

10. The system of claim 1, wherein the discrete inner connecting elements comprise one or more perforated or pre-weakened regions that when acted upon by a compressive stress cause at least a portion of the discrete inner connecting elements to deform.

11. The system of claim 1, wherein the surface of each of the at least four support legs comprises a contour that is complementary to the adjacent surface of the single outer connecting element such that when the surface and adjacent surfaces are pressed together, tightening of a respective fastener assembly causes the single outer connecting element and a respective discrete inner connecting element to compress together, preventing deformation of the grill skirt.

12. The system of claim 1, wherein the surface of each of the at least four support legs comprises a contour that is complementary to the adjacent surface of the single outer connecting element such that when the surface and adjacent surfaces are pressed together, tightening of the at least four fastener assemblies causes the first single outer connecting element to conform to the contour of the surfaces of the at least four support legs.

13. A method of assembling a grill, the method comprising:
   aligning a grill skirt with at least four support legs, wherein the grill skirt comprising at least four assembly regions, each of the at least four assembly regions comprising:
      a corner region of a single outer connecting element;
      a discrete inner connecting element; and
      an opening defined by the corner region of the single outer connecting element and the discrete inner connecting element, wherein aligning the grill skirt with the at least four support legs comprises inserting each support leg at least partially into a respective opening defined by the single outer connecting element and a respective discrete inner connecting element;
   securing the grill skirt to the at least four support legs using fastener assemblies configured to compress the single outer connecting element, the discrete inner connecting elements, and the at least four support legs; and
   tightening the fastener assemblies such that the discrete inner connecting element deforms, thereby pressing a surface of each of the at least four support legs against an adjacent surface of the single outer connecting element such that a visible surface of the grill skirt retains a substantially even surface.

14. The method of claim 13, further comprising inserting a portion of each of the at least four support legs into a respective opening defined by the single outer connecting element and the discrete inner connecting elements.

15. The method of claim 13, wherein securing the grill skirt to the at least four support legs comprises spanning the single outer connecting element and the discrete inner connecting elements with the fastener assemblies.

16. A system for attaching a leg to a grill skirt without deforming a visible surface of the grill skirt, the system comprising:
   a grill skirt comprising a single outer connecting element defining a substantially even visible surface and comprising four a leg attachment regions, each leg attachment region comprising a predefined surface shape or contour;
   at least four securing elements, wherein each securing element and a respective leg attachment region of the single outer connecting element define an opening between the securing element and the respective leg attachment region;
   a leg, wherein at least a portion of the leg is configured to be received in the opening; and
   a fastener assembly configured to extend from an outer surface of the grill skirt, through the opening and the leg, and to an outer surface of the securing element, and wherein tightening the fastener assembly causes the securing element to deform, thereby pressing the leg against the leg attachment region and retaining the substantially even visible surface of the grill skirt.

17. The system of claim 16, wherein the substantially even visible surface and the leg have complementary surface shapes.

18. The system of claim 16, wherein the securing element is configured to deform under a lower force than the grill skirt.

19. The system of claim 18, wherein:
each of the four securing elements is formed of a material that is different from or thinner than a material that forms the grill skirt; or
each of the four securing elements comprises one or more perforated or pre-weakened regions that when acted upon by a compressive stress cause at least a portion of each of the four securing elements to deform.

* * * * *

UNITED STATES PATENT AND TRADEMARK OFFICE
CERTIFICATE OF CORRECTION

PATENT NO. : 10,975,902 B2
APPLICATION NO. : 16/319178
DATED : April 13, 2021
INVENTOR(S) : Michael Virgil Colston and Daniel A. C. Altenritter Page 1 of 1

It is certified that error appears in the above-identified patent and that said Letters Patent is hereby corrected as shown below:

In the Claims

| | | | |
|---|---|---|---|
| Claim 6, | Column 11, | Line 46, | change "the first single" to --the single-- |
| Claim 7, | Column 11, | Line 49, | change "the first single" to --the single-- |
| Claim 7, | Column 11, | Line 50, | change "comprise" to --comprises-- |
| Claim 9, | Column 11, | Line 57, | change "the second discrete" to --the discrete-- |
| Claim 12, | Column 12, | Line 12, | change "the first single" to --the single-- |
| Claim 16, | Column 12, | Line 55, | change "four a leg" to --four leg-- |

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*